July 1, 1941.    A. KLAMMT    2,247,780
FLOOR LAYING APPARATUS
Filed Dec. 27, 1939
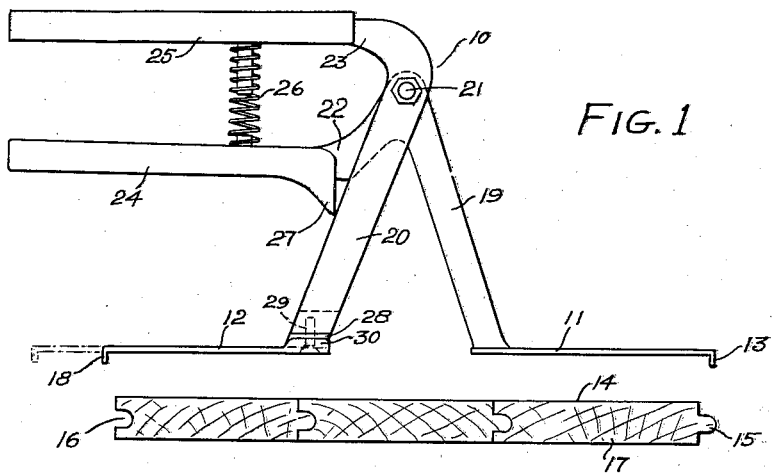
FIG. 1
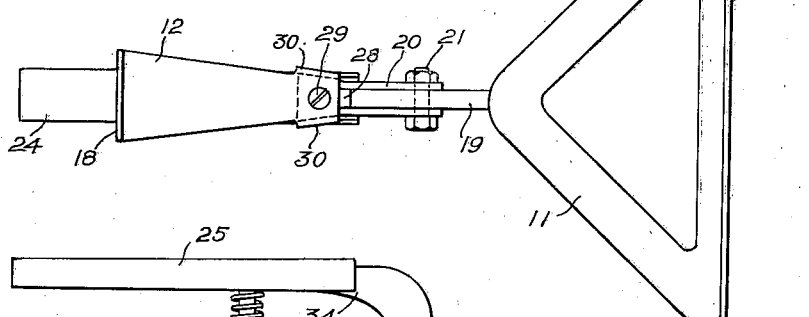
FIG. 2
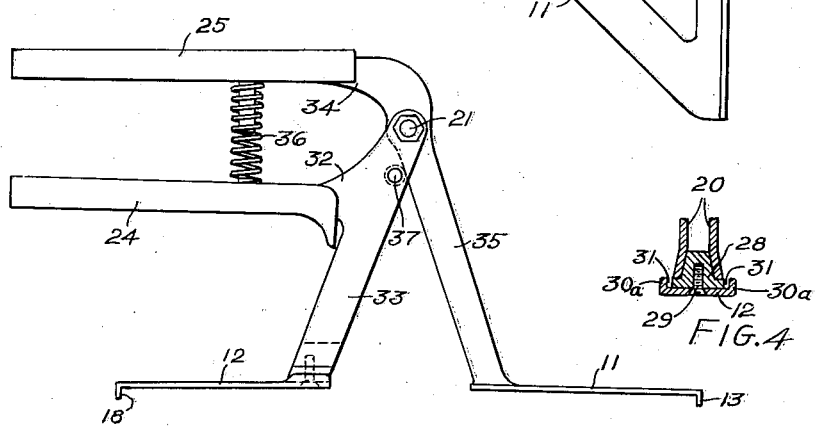
FIG. 3
FIG. 4
INVENTOR
ARTHUR KLAMMT.
BY
ATTORNEY Patented July 1, 1941

2,247,780

UNITED STATES PATENT OFFICE 2,247,780

FLOOR LAYING APPARATUS

Arthur Klammt, New York, N. Y., assignor to W. M. Ritter Lumber Company, a corporation of West Virginia Application December 27, 1939, Serial No. 311,090

7 Claims. (Cl. 294—118)

This invention pertains to improvements in floor laying apparatus.

An object is to provide a tool especially adapted to grip a flooring slat or block while dipping the lower surface thereof in mastic.

Other objects and advantages of the invention will become evident during the course of the following description in connection with the accompanying drawing, in which:

Figure 1 is a side elevation of a preferred form of the gripping tool;

Figure 2 is a bottom view of the same;

Figure 3 is a side elevation of an alternative form of the tool;

Figure 4 is a fragmental sectional view showing a means of securing the rear jaw to its shank.

Referring to Figures 1 and 2, the numeral 10 generally denotes a gripping tool having a flat front jaw member 11 and a rear jaw member 12. The front jaw member 11 is preferably of triangular shape as shown in Figure 2 and has a downwardly turned transverse lip 13 along its front end. The downward extent of the lip 13 is equal to or slightly less than the distance from the upper surface 14 to the tongue 15 or groove 16 of a standard flooring slat, three such slats being shown joined to form a parquet flooring block 17.

The rear jaw member 12 is relatively narrow and also has a downwardly turned lip 18 along its rear end, this lip being of the same vertical extent as the forward lip 13. The members 11 and 12 are respectively provided with angular shanks 19 and 20 pivoted together on a suitable bolt or pin 21. The shanks 19 and 20 have substantially horizontal rear extensions 22 and 23 carrying suitable handles 24 and 25, the extension 23 and its handle 25 being disposed above the extension 22 and handle 24. A compression spring 26 urges the handles apart, the lower handle 24 having a forward guard lip 27 which engages the shank 20 and acts as a stop. The jaws 11 and 12 are so proportioned that when they are in normal or open position, the lips 13 and 18 are spaced apart a distance slightly greater than the upper extent of the standard block 17. It will readily be seen that when the tool is placed on a block with the jaw lips overhanging the edges thereof and the handles are pressed together, the lips 13 and 18 grip the edges of the block above the tongue 15 and groove 16.

The forward jaw member 11 is preferably fastened permanently to its shank 19, while the rear jaw member 12 is detachably secured to a block 28 in the shank 20 by means of a screw 29. By this arrangement, rear jaws of various lengths may be provided to accommodate different standard widths of blocks or slats.

The wide lateral extent of the front lip 13 and the narrow extent of the central rear lip 18 cause the tool to exert an even and firm grip on the blocks being handled, irrespective of any possible irregularities or lack of parallelism of the edges of the blocks. For example, in the case of a block having a slight taper, a tool having wide jaws of substantially equal extent would grip the block only at one side of the jaws and thus would allow the block to swing downward out of grip. With the present invention, the narrow central rear jaw automatically forces the front edge of the block into alignment against the entire width of the front lip 13 so that a firm grip is easily maintained with minimum pressure and accidental release is prevented.

Lugs 30 on the rear jaw member 12 embrace the sides of the block 28 and normally assist in assuring parallelism of the lips 18 and 13 when the rear jaw member is screwed in place. If desired, however, the device may be constructed as shown in the detail Figure 4, wherein clearances 31 are provided between the lugs 30a and the sides of the block 28. With this construction, when very angular blocks or the like are to be handled, the rear jaw member 12 may be allowed to swivel about the screw 29, thus further facilitating the accurate alignment and even gripping action previously described.

The structure shown in Figure 3 is substantially the same as the preferred form described, except that the lower handle 24 is secured to the extension 32 of the rear shank 33 and the upper handle 25 to the extension 34 of the front shank 35. With this construction the spring 36 urges the jaws together instead of apart, so that the block is gripped by the spring action and released by the operator pressing the handles toward each other. The spring 36 is more powerful than the spring 26 in order to assure firm gripping, whereas the spring 26 need have only sufficient strength to retract the jaws. In the normally closed type shown in Figure 3, a stop 37 is provided to limit the closure, this stop also serving as a spacer between the side members of the straddle shank 33.

While the apparatus included in the invention has been described in preferred form, it is not limited to the particular structures set forth, as various changes and modifications may be made without departing from the scope of the appended claims.

What is claimed is:

1. In a tool for laying a flat flooring member, in combination, means adapted to engage an edge of said member throughout a wide lateral extent of said edge, means to engage the opposite edge of said member throughout a narrow lateral extent of said opposite edge, means to limit said engagement to the upper portions of said edges, resilient means normally urging said two engaging means apart, and manually operative means to move said two engaging means toward each other whereby said member may be gripped between said two engaging means.

2. In a floor laying tool, in combination, a wide jaw adapted to engage the top surface of a flooring member, a narrow jaw adapted to engage said surface, downwardly directed lateral lips on said jaws adapted to engage opposite edges of said flooring member, said lips having a vertical extent substantially less than the thickness of said flooring member, means movably connecting said jaws, means to move said jaws toward each other whereby said lips may grip said flooring member by said edges, and means to move said jaws apart to release said flooring member.

3. In a tool of the character described, in combination, a pair of substantially horizontal jaw members adapted to engage a flat surface, a long downwardly turned terminal lip on one of said members, a short downwardly turned lip on said other member, said lips being of small vertical extent and in substantially parallel alignment, upwardly extending shanks on said jaw members, a pivot movably securing said shanks together above the level of said members, whereby said members may be moved toward and away from each other, resilient means to move said members in one direction and manually operative means to move said members in the other direction.

4. The combination claimed in claim 3 wherein said manually operative means comprises substantially horizontal handles on said shanks and wherein said resilient means comprises a compression spring disposed between said handles.

5. In a tool for handling flat flooring members, in combination, a pair of pivoted shanks, substantially horizontal angular handles on said shanks, a flat horizontal jaw member on the lower end of one of said shanks, a flat horizontal jaw member detachably secured to the lower end of said other shank, a long terminal lip on one of said jaw members, a short terminal lip on said other jaw member in alignment with said first lip, said lips being of vertical extent less than the thickness of said floor members, resilient means normally urging said lips apart, and stop means to limit the movement of said lips apart to a distance slightly greater than the width of said flooring members.

6. In a tool for handling flooring blocks, in combination, a pair of pivoted shanks, a wide front jaw member on the lower end of one of said shanks, a narrow rear jaw member detachably secured to the lower end of said other shank substantially in line with the middle of said wide front jaw member, said jaw members being adapted to engage the upper flat surfaces of said blocks, downwardly extending terminal lips on said jaws, said lips being of vertical extent less than one-half the thickness of said blocks, substantially horizontal handles on said shanks above the level of said jaw members, and resilient means urging said jaw members apart.

7. In a tool for handling flooring blocks, in combination, a pair of pivoted shanks, a wide front jaw member on the lower end of one of said shanks, a narrow rear jaw member swivelled to the lower end of said other shank substantially in line with the middle of said wide front jaw member, said jaw members being adapted to engage the upper flat surfaces of said blocks, downwardly extending terminal lips on said jaws, said lips being of vertical extent less than one-half the thickness of said blocks, substantially horizontal handles on said shanks above the level of said jaw members, and resilient means urging said jaw members apart.

ARTHUR KLAMMT.